United States Patent [19]
Gay

[11] Patent Number: 5,454,914
[45] Date of Patent: Oct. 3, 1995

[54] METHOD OF REMOVAL OF HEAVY METAL FROM MOLTEN SALT IN IFR FUEL PYROPROCESSING

[75] Inventor: Eddie C. Gay, Park Forest, Ill.

[73] Assignee: The United States Department of Energy, Washington, D.C.

[21] Appl. No.: 172,313

[22] Filed: Dec. 23, 1993

[51] Int. Cl.$^6$ ..................................... C25C 3/34
[52] U.S. Cl. .................. 204/1.5; 204/64 R; 204/130
[58] Field of Search ........................... 204/1.5, 64 R, 204/130; C25C 3/34

[56] References Cited

U.S. PATENT DOCUMENTS

| | | | |
|---|---|---|---|
| 4,880,506 | 11/1989 | Ackerman et al. | 204/64 R |
| 5,009,752 | 4/1991 | Tomczuk et al. | 204/64 R |
| 5,356,605 | 10/1994 | Tomczuk et al. | 423/251 |

FOREIGN PATENT DOCUMENTS 3073896  3/1991  Japan ..................... 204/130

Primary Examiner—Kathryn Gorgos
Attorney, Agent, or Firm—Robert J. Fisher; Hugh Glenn; William R. Moser

[57] ABSTRACT

An electrochemical method of separating heavy metal values from a radioactive molten salt including Li halide at temperatures of about 500° C. The method comprises positioning a solid Li—Cd alloy anode in the molten salt containing the heavy metal values, positioning a Cd-containing cathode or a solid cathode positioned above a catch crucible in the molten salt to recover the heavy metal values, establishing a voltage drop between the anode and the cathode to deposit material at the cathode to reduce the concentration of heavy metals in the salt, and controlling the deposition rate at the cathode by controlling the current between the anode and cathode.

17 Claims, 3 Drawing Sheets

METHOD OF REMOVAL OF HEAVY METAL FROM MOLTEN SALT IN IFR FUEL PYROPROCESSING

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Electrorefining is a key step in the pyrometallurgical process that was developed to recover uranium, plutonium, and minor actinides from spent metal fuel from the Integral Fast Reactor (IFR). The IFR is an advanced reactor concept that was developed at Argonne National Laboratory. Its distinguishing features are that it is a sodium-cooled, pool-type reactor (i.e., all the major components, reactor core, pumps, and heat exchangers are in a large sodium-filled pot); it employs a metallic fuel (an alloy of U, Pu, and Zr clad with a stainless steel-type alloy); and it has an integral fuel cycle (discharged core and blanket materials are processed and refabricated in an on-site facility).

Experiments performed with an engineering-scale electrorefiner have been reported in the literature, see for instance U.S. Pat. No. 5,009,752 issued Apr. 23, 1993 to Tomczak et al., assigned to the assignee hereof, the disclosure of which is incorporated herein by reference. The electrorefiner consisted of a cadmium anode or anodic dissolution baskets, solid and liquid cathodes, and a molten salt electrolyte (LiCl—KCl) at 500° C. A dual cathode approach was adopted where uranium was recovered on a solid cathode mandrel and uranium-plutonium was recovered in a liquid cadmium cathode. In the engineering-scale electrorefiner, uranium has been electrotransported from the cadmium anode to a solid cathode in 10 kg quantities. Also, anodic dissolution of 10 kg batches of chopped fuel (U-10 wt % Zr) has been demonstrated. Development of the liquid cadmium cathode for recovering 4 kg of heavy metal has also been demonstrated.

In the electrorefining of spent IFR metal fuel to recover uranium and plutonium in the Fuel Cycle Facility, the concentrations of alkali, alkaline earth, and rare earth fission products in the salt in the electrorefiner must be reduced to lower the amount of heat generated therein. A heavy metal drawdown step (an operation to reduce the heavy metal concentration in the salt) is required before removing the fission products from the salt.

Previously, the technique for removing uranium and plutonium had involved a chemical displacement using a mixture of lithium and cadmium. As described in the attached document, tests with this procedure resulted in the formation of intermetallic compounds (solids) as a barrier to continued reaction. Dissolution of the intermetallic compounds required raising the melt temperature to 550° C. from the normal 500° C., which would be unacceptable in the electrorefiner because of increased cadmium vapor pressure.

This invention involves a method of electrochemically displacing the heavy metals by suspending a solid mixture of lithium and cadmium as an anode in the molten salt with a separate cathode, and applying voltage to drive the lithium and uranium (formed from a chemical reaction between the lithium and uranium chloride in the salt) into the salt and reduce the heavy metal or metals at the cathode. Tests have shown that the intermetallic barrier formed with the chemical method does not form with the electrochemical, thereby permitting U values to be reduced to parts per million.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
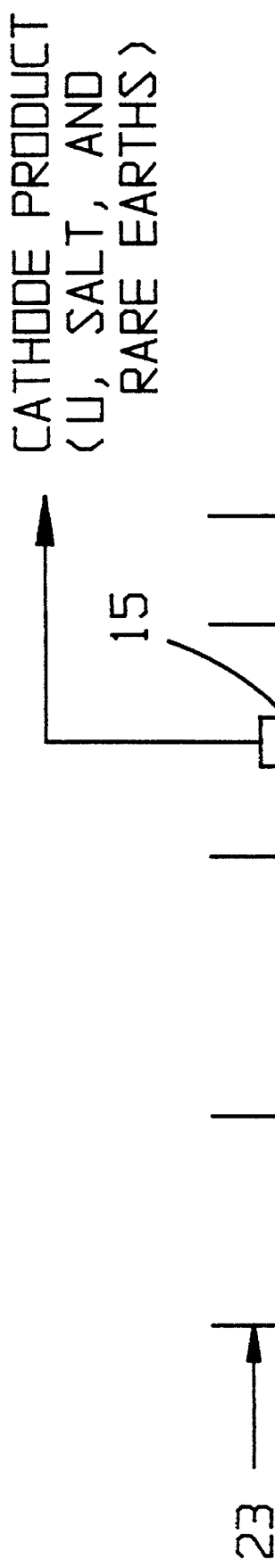
FIG. 1 is a schematic representation of equipment for practicing the process of the invention.

A schematic representation of the drawdown operation is shown in FIG. 1. A lithium-cadmium alloy 11 (5.8 wt % lithium) that is solid at 500° C. is loaded into the anodic dissolution baskets 13 and rotated at 75 rpm; current is driven from the anodic dissolution baskets to a solid mandrel cathode 15, positioned above a ceramic crucible 17 to collect the product that falls off of the solid cathode. The anode 11 and cathode 15 are at least partially immersed in the cell electrolyte 19 above a cadmium pool 21 (about 500° C.) contained in a steel vessel 23. The possible drawdown reactions include (1) electrotransport of lithium to the solid cathode and lithium reduction of the uranium and rare earth chlorides at the solid cathode and (2) lithium reduction of the uranium and rare earth chlorides at the anode and electrotransport of the uranium and rare earths to the solid cathode. The design criteria that had to be met for the drawdown equipment include the following: (1) control of the reduction rate by lithium, (2) good separation between uranium and rare earths, and (3) the capability to collect uranium and rare earths over a wide range of salt concentrations.

The purpose of the draw-down test in the engineering-scale electrorefiner is (1) to reduce the uranium concentration in the salt to about 1 wt % uranium prior to transfer of about 15 gallons of the salt to the stripper and (2) to determine the lowest uranium and rare earth concentrations in the salt that could be achieved using this electrochemical technique. Uranium depletion tests were made in the electrorefiner prior to the draw-down tests to provide data on uranium mass tracking for material control and accountability.

The objective of the present draw-down tests was to determine operating conditions needed to eliminate the intermetallic compounds formed in previous tests. In these earlier experiments, after the salt was contacted with Cd—Li alloy, the reduced heavy metal was difficult to dissolve due to the formation of intermetallic compounds at the salt-cadmium interface. Dissolution of these intermetallic compounds required raising the melt temperature to 550° C. This increase in temperature is undesirable in the electrorefiner because of the increased cadmium vapor pressure.

A Cd—Li alloy dissolver was designed to provide data needed to meet the above objective. A steel loading tube was attached to the cover of the electrorefiner. This tube was supported so that the lower end was positioned in the salt or in the cadmium. A vent hole was drilled in the tube. The Cd—Li alloy was loaded into a perforated, cylindrical container provided with a slot for loading the sample and a weighted perforated disk that retained the sample in the loader. Also, the height of the disk in the loader indicated when the sample had been dissolved. The loading tube isolated the Cd—Li loader from the bulk salt when the lower end of the tube was placed in the cadmium pool.

The Cd—Li dissolver was designed to provide data to determine the feasibility of the following dissolution and electrotransport mechanisms:

1. Dissolution of Cd—Li alloy by direct contact with the cadmium pool and electrotransport of uranium formed at the cadmium/salt interface to a solid mandrel cathode.

2. Formation of a layer of uranium on Cd—Li ingots (a lithium concentration of 5.8 wt. % was selected such that the alloy was solid at 500° C.) placed in the salt, electrotransport of the uranium to a solid mandrel cathode by anodic dissolution, and subsequent continuation of the uranium draw-down as more lithium in the alloy is exposed to the uranium chloride in the salt.

Draw-down Tests 58, 59, and 60 were completed to investigate the electrotransport mechanisms. The Cd—Li loader was used for Run 58 and anodic dissolution baskets were used in Runs 59 and 60. The operating conditions and results for these tests are presented below:

Run 58—For this test, the Cd—Li alloy was added to the electrorefiner in the dissolver described. Electrical contact between the dissolver and the cadmium pool in the electrorefiner was made by direct contact or through the electrorefiner cover (when the dissolver was positioned in the salt). A total of 4,689 kg Cd—Li alloy (5.8 wt % lithium) was added to the electrorefiner in 21 batches. Simultaneous draw-down and electrotransport were carried out after the addition of 0.669, 1.561, and 1.567 kg Cd—Li alloy to the electrorefiner.

The result of the above tests is given in Table 1. In Test 1, examination of the dissolver after 4 hours in the cadmium pool showed that the Cd—Li alloy was not completely dissolved. The dissolver was not examined during overnight operation. After 20 hours, examination of the dissolver showed that the Cd—Li alloy was completely dissolved. Test 2 was similar to Test 1, but an examination of the dissolver after 9 hours showed that the material was not completely dissolved. Based on these tests, the dissolution rate of the Cd—Li alloy in the cadmium pool is between 0.03–0.2 kg/h. In Tests 3 and 4, the dissolver was positioned in the salt. The anodic dissolution and draw-down reaction proposed above was tested. Based on these tests, the dissolution rate of the Cd—Li alloy is between 0.07–0.2 kg/h.

TABLE 1

Operating Conditions for Uranium Draw-Down and Electrodeposition Run 58

| Test Number | Wt. Cd—Li Alloy Added, kg | Solvent | Dissol./Electrodep. Time, h | Current, A | Est. Dissol. Rate,[a] kg/h |
|---|---|---|---|---|---|
| 1 | 0.669 | cadmium | 4–20 | 55–61 | 0.033–0.17 |
| 2 | 0.892 | cadmium | 9–23 | 67–101 | 0.039–0.10 |
| 3 | 1.561 | salt | 8–23 | 75–113 | 0.07–0.20 |
| 4 | 1.567 | sat | 8–23 | 70–77 | 0.07–0.20 |

[a]The dissolution rate for these tests was greater than the lower value shown and less than the higher value.

Under the operating conditions tested in Tests 1 to 4, the Cd—Li alloy dissolution rates with the dissolver immersed in the cadmium pool or in the salt could not be measured accurately because of the unattended overnight operation. However, Tests 3 and 4 demonstrated the feasibility of simultaneous uranium draw-down and anodic dissolution. In order to test this draw-down mechanism under more favorable operating conditions for anodic dissolution the Cd—Li alloy was loaded into the electrorefiner in the anodic dissolution baskets normally used to dissolve chopped, clad uranium-zirconium pin segments and uranium draw-down tests were continued in Runs 59 and 60.

Runs 59 and 60—In Run 59, 4.848 kg Cd—Li alloy was distributed equally between 4 anodic dissolution baskets; 5.751 kg alloy was loaded in Run 60. The following operating conditions were used in these tests:

1. Rotation speed of anodic dissolution baskets was 75 rpm.
2. Cadmium mixer speed was 50 rpm.
3. Salt mixer was not used.
4. Voltage cutoff was 1.3 V.

Results of Tests 59 and 60 are given in Table 2. The calculated weight of uranium that should be removed from the salt, based on the weight of Cd—Li alloy added to the electrorefiner, is 3.820 and 4.532 kg uranium, respectively, for Runs 59 and 60.

The dissolution time given in Table 2 is the time required to dissolve all of the Cd—Li alloy loaded in the anodic dissolution baskets. At this point, there would be no uranium available for electrotransport to the solid mandrel cathode.

TABLE 2

Results of Cadmium-Lithium Alloy Dissolution Tests

| Run Number | Weight of Cd—Li Alloy[a], kg | Dissolution Time[b], h | Ampere-Hours[b] | Average Current, A | Dissolution Rate | |
|---|---|---|---|---|---|---|
| | | | | | kg/h | g/Ah |
| 59 | 4.848 | 8.0 | 1306 | 163 | 0.61 | 3.7 |
| 60 | 5.751 | 12.0 | 1065 | 89 | 0.48 | 5.4 |

TABLE 2-continued

Results of Cadmium-Lithium Alloy Dissolution Tests

| Run Number | Weight of Cd—Li Alloy[a], kg | Dissolution Time[b], h | Ampere-Hours[b] | Average Current, A | Dissolution Rate kg/h | g/Ah |
|---|---|---|---|---|---|---|

[a]5.8 wt % lithium.
[b]Determined from change in cell current and resistance during anodic dissolution.

This condition results in a sharp increase in the cell resistance and a sharp decrease in the anodic dissolution current. In Runs 59 and 60, the measured dissolution times were 8.0 and 12.0 h, respectively. The voltage-time profile for Run 59 showed that the cell voltage was typically between 0.6 to 0.7 V and never exceeded 0.9 V. Thus, the dissolution rate could have been increased by increasing the anodic dissolution current with a higher cell voltage (up to 1.3 V). Under these operating conditions, a Cd—Li dissolution rate greater than 0.6 kg/h would be expected. The voltage-time profile for Run 60 showed that the cell voltage (0.3–0.5 V) was typically lower than that for Run 59. Thus, the anodic dissolution current for Run 60 was about 54% of that for Run 59. The lower Cd—Li dissolution rate for Run 60 (0.48 kg/h) compared to that of Run 59 (0.61 kg/h) is consistent with the belief that the Cd—Li dissolution rate is affected by the anodic dissolution current. The weight of Cd—li alloy dissolved per ampere hour (Table 215-2) is about 46% greater for Run 60 (5.4 g/Ah) than for Run 59 (3.7 g/Ah).

The Cd—Li dissolution rates measured with the anodic dissolution baskets (Table 2) are three times faster than the most optimistic dissolution rates measured by loading the alloy in a perforated cylindrical container (Table 1) and immersing this container in the cadmium pool or the salt in the electrorefiner. It is recognized that the design of the perforated cylindrical container has not been optimized and that the dissolution rate with the anodic dissolution baskets has the potential to be increased by simply increasing the anodic dissolution current. However, based on the present IFR electrorefiner development, removal of heavy metal from the salt by adding the Cd—Li alloy to the electrorefiner in the anodic dissolution baskets offers advantages of higher dissolution rates and elimination of intermetallic compounds formed from the reduced heavy metals. The current and resistance also provide convenient indicators when the Cd—Li alloy has been completely dissolved. This method is recommended for the Fuel Cycle Facility electrorefiner.

Uranium drawdown Tests 65, 66, and 68 were completed and the objective of these tests was to determine the lowest uranium concentration in the salt and cadmium pool in the engineering-scale electrorefiner that can be achieved by electrotransport of uranium to a solid mandrel or liquid cadmium cathode. When the equipment (pump, transfer line, and stripper vessel) for the stripper test is completed, the uranium concentration in the salt in the engineering-scale electrorefiner will be increased to the concentration desired for this test. Therefore, the concentration of uranium in the electrorefiner after the drawdown tests will not be the same as that used for the stripper test.

Results for the above drawdown tests and accompanying depletion tests are presented below and in Table 3.

Run 64—This test was a repeat of Run 63, which produced a salt-like deposit (10.2 kg weight) with only 1.0 kg uranium (10.0 wt %). The cadmium and salt in the electrorefiner were mixed at 50 and 20 rpm, respectively. The electrodeposition time was 173.2 h (4104 Ah) and the average current was 23.7 A.

The salt-like deposit from Run 64 was similar to that produced in Run 63. The deposit weighed 7.6 kg and contained very little uranium (0.24 kg, 1.0 wt %). The zirconium concentration in the deposit was 32.9 wt %. The salt concentration in the deposit was 57.3 wt %. The uranium collection efficiency on the solid mandrel cathode 64 was very low (2.0%). The uranium concentration in the cadmium pool after Run was <0.02 wt %. The results in Table 4 show that salt-like cathode deposits were produced under the following conditions:

1. The average uranium concentration in the cadmium pool was <0.1 wt %.
2. The uranium concentration in the salt was 3.78 to 6.56 wt %.
3. The cadmium pool was nearly saturated with zirconium.
4. The cadmium pool contained undissolved zirconium.

TABLE 3

Uranium Depletion md Drawdown Tests Completed during the October 1991 reporting Period

| Run No. | Wt. of Cd—Li Alloy[a], kg | Electrotransport Parameters | | Average Current, A | Cathode Product Wt, kg | | Uranium Collection Efficiency, % |
|---|---|---|---|---|---|---|---|
| | | Time, h | Ah | | Deposit | Uranium | |
| 64 | [b] | 173.2 | 4104 | 23.7 | 7.6 | 0.24 | 2.0 |
| 65 | 4.587 | 9.9 | 968 | 97.8 | 2.0 | 1.77 | 59 |
| 66 | 4.158 | 25.9 | 1059 | 40.9 | 1.3 | [c] | [b] |
| 67 | [b] | 43.8 | 1403 | 32.0 | 3.7 | <0.04 | <1.0 |

[a]5.8 wt % lithium-cadmium alloy.
[b]Not applicable.
[c]Cadmium bridged across cathode shaft to housing and caused a short-circuit with the electrorefiner crucible; no uranium was electrodeposited on the cathode shaft.

TABLE 4

Summary of Uranium Depletion and Drawdown Tests

| Run No.[a] | U Conc.,[b] wt % Salt | U Conc.,[b] wt % Cd Pool | U Solids, kg | Zr conc. in Cd Pool,[b] wt % | Zr Solids, kg | Composition of Cathode Product[b] wt % U | Composition of Cathode Product[b] wt % Zr | Composition of Cathode Product[b] wt % Salt |
|---|---|---|---|---|---|---|---|---|
| 19 | 6.56 | c | d | e | e | 81.8 | 0.4 | 17.8 |
| 20 | 6.56 | 0.74 | 1.618 | 0.23 | 3.298 | 80.8 | 1.0 | 17.9 |
| 21 | 6.56 | c | d | e | e | 22.6 | 21.2 | 56.0 |
| 22 | 6.56 | <0.01 | 1.618 | 0.13 | 2.166 | 2.0 | 6.8 | 91.2 |
| 28 | 6.56 | 0.02 | 1.618 | 0.16 | 3.024 | 14.8 | 7.4 | 74.3 |
| 56 | 7.09 | 0.48 | 8.813 | 0.22 | 14.664 | 77.7 | 6.2 | 8.2 |
| 57 | 7.09 | 0.41 | 7.430 | 0.22 | 14.664 | 85.7 | 0.03 | 7.1 |
| 61 | 3.44 | c | d | d | d | 77.9 | 3.9 | 19.0 |
| 62 | 3.44 | c | d | d | d | 79.0 | 5.2 | 12.3 |
| 63 | 3.40 | <0.01 | 6.551 | 0.21 | 12.411 | 7.1 | 11.9 | 84.3 |
| 64 | 4.24[e] | <0.02 | 1.857 | 0.20 | 9.932 | 1.0 | 32.9 | 57.3 |
| 65 | 4.33[e] | <0.72 | 1.618 | 0.21 | 9.851 | 8.7 | 0.14 | 16.5 |
| 67 | 3.78 | <0.10 | d | d | d | <0.01 | 20.0 | 57.4 |

[a]Anodic dissolution baskets with the 5.8 wt % Li—Cd alloy were used in Run 65; the cadmium pool anode was used in the remaining tests.
[b]Estimated uncertainty in the chemical analysis is ±5 to 10%.
[c]No salt or cadmium sample was taken after this run.
[d]Not measured.
[e]Averaged over the run.

It was concluded from the above that, at low uranium concentration in the cadmium pool, conditions can exist that favor the electrotransport of zirconium. Under these conditions, the uranium can be removed more easily from the electrorefiner by adding cadmium chloride to the electrorefiner to drive the uranium into the salt and then use reduction and direct transport to collect this uranium on a solid mandrel or liquid cadmium cathode.

Run 65—In this test, 4.587 kg lithium-cadmium alloy (5.8 wt % lithium) was loaded into the anodic dissolution baskets and uranium was removed from the salt and collected on a solid mandrel cathode. During the run, the anodic dissolution baskets and the solid mandrel cathode were rotated at 75 rpm and 20 rpm, respectively. The salt and cadmium mixers were not operated during this run. The dissolution-electrodeposition time was 9.9 h (968 Ah) and the average current was 97.8 A.

The voltage, current, and resistance vs time profiles for Run 65 show that the current was nearly constant throughout the run (90–100 A). The resistance increased from about 12 mΩ to 14 mΩ as the lithium-cadmium alloy was dissolved; the 1.3 V cutoff was reached at this point.

A typical dendritic uranium deposit was produced at the cathode. The product weighed 2.0 kg and contained 1.8 kg uranium. The composition of the deposit was 88.7 wt % uranium, 16.5 wt % salt, and 0.14 wt % zirconium. The collection efficiency (59%) on the solid mandrel cathode was slightly higher than normal (typically 40–50%) for electrodeposition on a solid mandrel cathode.

At this point in the drawdown, the uranium concentration in the salt was 4.33 wt %. The following were favorable characteristics of this run:

1. The uranium drawdown-collection rate was 0.2 kg uranium per hour.
2. The uranium concentration (88.7 wt %) in the cathode product was high and the zirconium concentration (0.14 wt %) was low.
3. The uranium collection efficiency (59%) was slightly higher than normal.

Run 66—This test was a repeat of Run 65, but with a lower average uranium concentration in the salt. The operating conditions and results for this run are given in Tables 3 and 4. An electrical short circuit developed during the run and the solid mandrel cathode was short-circuited to the cadmium pool. The short was caused by condensed cadmium that bridged from the cathode mandrel to the cathode housing, which is in electrical contact with the electrorefiner crucible. A malfunction in the cover gas treatment system caused a high concentration of cadmium vapor in the electrorefiner. Most of the uranium that was removed from the salt in this run was electrodeposited on the wall of the electrorefiner crucible.

Run 67—The objective of this test was to electrotransport uranium from the wall of the electrorefiner crucible and the cadmium pool to a solid mandrel cathode, with a low uranium concentration in the cadmium pool. This uranium was deposited on the crucible and in the cadmium pool in Run 66, after a short-circuit developed between the solid mandrel cathode and the electrorefiner crucible. The cadmium and salt were mixed at 50 and 20 rpm, respectively. The electrodeposition time was 43.8 h (1403 Ah) and the average current was 32.0 A. A salt-like deposit was produced and weighed 3.7 kg. Based on the assumption of zirconium metal in the deposit, the measured composition of the deposit was 57.4 wt % salt, 20.0 wt % zirconium metal, and <0.01 wt % uranium metal. A better mass balance is achieved if the assumption is made that the form of the zirconium in the deposit is zirconium chloride ($ZrCl_2$); the composition of the deposit in this case would be 57.4 wt % salt, 35.5 wt % zirconium chloride, and <0.01 wt % uranium.

Based on the above results, when the uranium concentration in the cadmium pool is <0.10 wt % uranium, the cadmium is saturated with zirconium, and the cadmium pool contains undissolved zirconium, a salt-like product with low uranium concentration is produced. This result agrees with that found in Run 64 and previous runs shown in Table 4. These results indicate that it is difficult to electro-transport uranium from the cadmium pool and the crucible under the above operating conditions.

Run 68/LCC-11 In this test, 5.173 kg lithium-cadmium alloy (5.8 wt % lithium) was loaded into the anodic dissolution basketsand used to electrotransport uranium from the salt to a liquid cadmium cathode (LCC). The starting condition for the LCC is given in Table 5. The interelectrode distance (25.4 cm), height of salt above the LCC crucible (1.3 cm), and freeboard (7.1 cm) were the same as that used for Run AD-LCC-7/7A, which collected 4.2 kg uranium in the cathode product. The weight of cadmium used in Run 68/LCC-11 (12.22 kg) was greater than that used in Run AD-LCC-7/7A (9.66 kg). The operating procedure for Run 68/LCC-11 was similar to that used previously. The operating steps consisted of electrodeposition, compaction, and cleanout. The latter steps were used to retard the formation of uranium dendrites above the salt/cadmium interface in the LCC.

TABLE 5

Starting Condition for Liquid Cadmium Cathode (LCC) Run 68/LCC-11

| | |
|---|---|
| Cd Height in LCC, cm | 11.6 |
| (weight, kg) | (12.224) |
| LCC Electrode Area, [a]cm$^2$ | 153 |
| Freeboard in LCC, cm | 7.1 |
| Interelectrode Distance, cm | 25.4 |
| Height of Salt Above LCC Crucible, cm | 1.3 |

[a]Cross-sectional area at salt-cadmium interface in LCC crucible.

For approximately 90% of Run 68/LCC-11, the electrorefiner voltage was 1.0 V or less. The highest current was about 70 A. The lower current at the end of the run was the result of the higher cell resistance as the lithium-cadmium alloy was dissolved. Results of this test are given in Table 6. The average current for the run was 35.8 A and the total dissolution-electrodeposition time was 25.8 h. Based on the weight of the LCC product, 2.1 kg uranium was collected in the cathode. Samples of the product will be taken and submitted for chemical analysis. The collection efficiency for the test was 77%.

Run 69—In this test, uranium was electrotransported from the cadmium pool anode to a solid mandrel cathode. At the start of the run, the uranium concentration was approximately 0.8 wt. % in the cadmium pool and 3.6 wt % in the salt. Based on previous drawdown tests, a cathode product with high uranium concentration was expected.

The mixing conditions were the same at those used for recent tests with electrotransport of uranium from the cadmium anode pool to a solid mandrel cathode. The mixing conditions were 50 rpm for the cadmium mixer, 20 rpm for the salt mixer, and the solid mandrel cathode rotation speed was 20 rpm.

The current was held constant (34.2 A) during Run 69 and the voltage increased from about 0.4 V to 0.8 V, the voltage cutoff. The resistance increased from about 10 mΩ. to 23 mΩ. Results from this test are given in Table 6. The electrodeposition time was 38.8 h and a total of 1326 Ah was passed through the electrorefiner during the test. The uranium collection efficiency was 69%.

The cathode deposit of Run 69 weighed 3.6 kg and contained 74.7 wt % (2.7 kg) uranium, 9.4 wt % zirconium, and 0.3 wt % cadmium. A thin layer of material that appeared to have different physical characteristics from the bulk material was found at the top of the deposit. The composition of this material was 12.6% wt % uranium, 27.5 wt % zirconium, 1.1 wt % cadmium, and 53.0 wt % salt. The appearance of this material was similar to that found on top of the cathode product from Run 64, which had a composition of 3.5 wt % uranium, 22.0 wt % zirconium and 62.1 wt % salt.

Run 70—In this test, 6.341 kg lithium-cadmium alloy (5.8 wt % lithium) was loaded into the anodic dissolution baskets and used to electrotransport uranium from the salt to a solid mandrel cathode. At the start of the run, the uranium concentration in the salt was 3.65 wt % uranium. The mixing conditions for this run were the same as the conditions used in Runs 65 and 66. The rotation speeds of the anodic dissolution baskets and the solid mandrel cathode were 75 and 20 rpm, respectively. The salt and cadmium mixers were not used in this run.

Run 70 results are given in Table 6. For approximately 5 hours at the start of the test, the current was held between 70 and 80 A. For overnight operation, the current was reduced to about 32 A. The average current during the run was 33.9 A, which is about 35% of the average current for an earlier drawdown test (Run 65). After about 13 hours, nearly all of the lithium-cadmium alloy in the anodic dissolution baskets was dissolved. The voltage increased from about 0.5 V as the cell resistance increased from between 10 to 20 mΩ to 40 mΩ. When all of the lithium-cadmium alloy was dissolved, the cell resistance increased to about 70 mΩ. The total dissolution-electrotransport time was 25.6 h.

The cathode deposit of Run 70 was dendritic and weighed 3.5 kg (2.5 kg uranium). The uranium collection efficiency was very high (97%) and is attributed to the lower average current used in this run. The composition of the deposit was

TABLE 6

Uranium Drawdown and Depletion Tests Completed During the December 1991 Reporting Period

| Run No. | Wt. of Cd—Li Alloy[a], kg | Electrotransport Parameters | | Average Current, A | Cathode Product Wt, kg | | Collection Efficiency, % |
|---|---|---|---|---|---|---|---|
| | | Time, h | Ah | | Deposit | Uranium | |
| 68/LCC-11[b] | 5.173 | 25.8 | 924 | 35.8 | 14.3 | 2.1[c] | 77 |
| 69 | d | 38.8 | 1326 | 34.2 | 3.6 | 2.7 | 69 |
| 70 | 6.341 | 25.6 | 869 | 33.9 | 3.5 | 2.5 | 97 |
| 71 | 3.030 | 21.0 | 631 | 30.0 | 2.3 | 1.8 | 96 |

[a]5.8 wt % lithium-cadmium alloy.
[b]Uranium was electrotransported to a LCC in this run; a solid mandrel cathode was used in Runs 69–71.
[c]Based on the weight of the LCC product; chemical analysis of the product has not been completed.
[d]Not applicable.

70.0 wt % uranium, 30.2 wt % salt, 0.1 wt % zirconium, and 1.0 wt % cadmium.

Run 71—In this test, 3.030 kg lithium-cadmium alloy (5.8 wt % lithium) was loaded into the anodic dissolution baskets and used to electrotransport uranium from the salt to a solid mandrel cathode. At the start of the run, the uranium concentration in the salt was 2.31 wt % uranium. The mixing conditions during the test were the same as the conditions used in Run 70.

Run 71 results are given in Table 6. For the initial 5 h of testing, the current was held between 60 to 70 A. For the last 10 h of testing, the current was about 17 A. The average current during the run was 30.0 A. The total dissolution/electrotransport time was 21 h. During the run, the cell resistance increased from about 13 mΩ to 75 mΩ.

The cathode deposit of Run 71 was dendritic, weighed 2.3 kg, and contained 1.8 kg uranium. A very high collection efficiency (96%) was achieved in this test. This result is consistent with the result for Run 70, which was also operated at a lower average current than previous drawdown tests. The composition of the deposit was 79.5 wt % uranium, 19.6 wt % salt, 0.06 wt % zirconium, and 0.7 wt % cadmium.

Run 72—In this test, 4,053 kg lithium-cadmium alloy (5.8 wt % lithium) was loaded into the anodic dissolution baskets and used to electrotransport uranium from the salt to a solid mandrel cathode. The salt and cadmium mixers were operated at 75 and 50 rpm, respectively. The rotation speed of the anodic baskets and the cathode was 75 and 20 rpm, respectively. The concentration of uranium in the salt at the start of the test was 1.35 wt % uranium and <0.01 wt % uranium in the cadmium pool in the electrorefiner.

The operating time of the drawdown for Run 72 was 22.5 h and the average current was 39.1 A. For the initial 6 h of the test, the current was about 60 A and the voltage nearly 1.2 V. For overnight operation, the current was reduced to about 33 A and the voltage was a little over 0.8 V. During the run, the cell resistance increased from about 15 mΩ to nearly 40 mΩ. At the end of the run the voltage was about 1.2 V and the current was about 20 A.

The salt-like cathode deposit for Run 72 was not the typical uranium dentritic product. The weight and composition of the deposit are given in Table 7. The weight and composition of dendritic deposits collected in the previous two runs (Tests 70 and 71) are also given in this table. The deposit from Run 72 weighed 2.3 kg and contained 0.73 kg uranium. The composition of the deposit was 31.8 wt % uranium, 17.3 wt % zirconium, 40.6 wt % salt, 2.8 wt % cerium, and 1.0 wt % cadmium.

A calculation of the limiting current for electrotransport of uranium in Run 72 indicated that a current of about 3 A was more favorable for this drawdown than was the higher average current (39.1 A) used in the test. This high operating current and voltage (1.2 V) could cause electrotransport of cerium to the cathode. Also, cerium chloride could be reduced by lithium electrotransported to the cathode. It also appears that cadmium may have been oxidized to cadmium chloride at the anodic baskets by the high operating voltage. This cadmium chloride could oxidize some of the zirconium in the cadmium pool in the electrorefiner (driving the zirconium into the salt) and the zirconium chloride could then be reduced at the cathode. The cadmium chloride could also oxidize uranium and cerium on the cathode, resulting in some cadmium pickup by the deposit. These proposed mechanisms are consistent with the measured composition of the product.

TABLE 7

| | Composition of Cathode Deposits | | | | |
|---|---|---|---|---|---|
| | Product Weight, kg | | Composition of Cathode Product[a], wt % | | |
| Run No. | Deposit | Uranium | Uranium | Zirconium | Salt |
| 70 | 3.5 | 2.5 | 70.0 | 0.1 | 30.2 |

TABLE 7-continued

| | Composition of Cathode Deposits | | | | |
|---|---|---|---|---|---|
| | Product Weight, kg | | Composition of Cathode Product[a], wt % | | |
| Run No. | Deposit | Uranium | Uranium | Zirconium | Salt |
| 71 | 2.3 | 1.8 | 79.5 | 0.06 | 19.6 |
| 72 | 2.3 | 0.73[b] | 31.8 | 17.3 | 40.6 |

[a]Estimated uncertainty in the chemical analysis is ±5 to 10%.
[b]Product also contained 2.8 wt % cerium and 1.0 wt % cadmium.

Run 73—The procedure used for this test was identical to that used in Run 72. The 5.8 wt % lithium-cadmium alloy (4.676 kg) was loaded into the anodic dissolution baskets and used to electrotransport uranium from the salt to a solid mandrel cathode. The concentration of uranium in the salt at the start of the test was 1.25 wt % and <0.01 wt % uranium was in the cadmium pool in the electrorefiner.

At the end of the test, the concentration of uranium in the salt was <0.025 wt % uranium. However, the uranium removed from the salt did not adhere to the solid mandrel cathode. The deposit slipped off of the mandrel and fell into the cadmium pool. A filtered sample taken from the cadmium pool showed an increase in the uranium and rare earth concentrations (0.49 wt % uranium, 0.056 wt % cerium, and 0.061 wt % neodymium).

The above results indicate the need for a "catch" crucible under the solid mandrel cathode to receive deposit that slips off of the mandrel. For subsequent tests in the drawdown operation, the liquid cadmium cathode assembly was be modified to accommodate a ceramic crucible suitable for a receiver container.

Run 74—Over a period of about 55 hours, 1048 Ah was passed through the electrorefiner. Uranium was electrotransported from the cadmium anode pool to the solid mandrel cathode. The mixing conditions for this operation were as follows: 1) cadmium and salt mixers were operated at 50 and 20 rpm, respectively, and 2) the cathode mandrel rotation speed was 20 rpm.

No product was collected on the solid mandrel cathode in Run 74. As was observed in Run 73, the uranium electrotransported to the solid mandrel cathode slipped off of the mandrel and fell back into the cadmium pool. Cadmium chloride (3.194 kg) was added to the electrorefiner to oxidize the uranium in the cadmium pool. At the start of Run 73, the concentration of uranium in the salt and cadmium pool was <0.025 and 0.50 wt % uranium, respectively (<0.057 and 1.752 kg uranium, respectively). After the cadmium chloride was added to the electrorefiner, the concentration of uranium in the salt and cadmium pool was 1.19 and 0.019 wt % uranium, respectively (2.739 and 0.067 kg uranium, respectively).

Run 75—In this test, 3.050 kg lithium cadmium alloy (5.8 wt % lithium) was loaded into the anodic dissolution baskets and used to electrotransport uranium from the salt to the tip (steel probe) of the liquid cadmium cathode (LCC) dendrite breaker, which was positioned above an alumina crucible. No cadmium was loaded in this crucible, which was used previously as the LCC crucible. The mixing conditions for this run were as follows: 1) the cadmium pool and salt mixers were operated at 50 and 75 rpm, respectively, 2) the rotation speed of the anodic dissolution baskets was 75 rpm, and 3) the rotation speed of the LCC dendrite breaker was 15 rpm.

The operating time of the drawdown for Run 75 was 69 h and the average current was 10.3 A. The operating voltage was typically 1.2 V and the resistance was between 100 and 200 MΩ. The average current for Run 75 was about 25% of that used in the previous drawdown test (Run 72, 39.1 A average current) in which product was collected on the solid mandrel cathode. This lower current resulted from the lower initial cathode area (15.5 cm$^2$) used in Run 75 compared with Run 72 (476.6 cm$^2$).

The weight of the cathode deposit collected in Run 75 was 4.90 kg. The product dimensions were 5½-in. diameter × 6¾ in. length. Top, middle, and bottom samples were taken from the product and submitted for chemical analysis. The composition of the deposit is given in Table 8. The compositions of deposits from previous runs are also given in this table. The deposit from Run 75 contained 39.2 wt % uranium, 63.6 wt % salt, and 0.05 wt % zirconium. This deposit contained a higher concentration of salt than previous drawdown runs. The rare earth concentration on the deposit is given in Table 9. The values in this table represent the rare earth concentration that cannot be accounted for by the concentration of salt in the deposit. The concentrations of cerium, neodymium, and yttrium in the deposit from Run 75 were 0.9, 0.8, and 0.1 wt %, respectively. This is one of the first measurable rare earth concentrations in the cathode deposits from the drawdown runs; Run 72 showed 2.8 wt % cerium in the deposit.

The composition of the salt and cadmium pool after Run 75 are given in Table 10. After the run, the uranium concentration in the salt was reduced to 0.26 wt %. The rare earth concentrations (0.83 wt % Ce, 0.82 wt % Nd, and 0.18 wt % Y) were about 10% lower than the highest values measured (0.98 wt % Ce, 0.93 wt % Nd, and 0.21 wt % Y in Run 72). The uranium concentration in the cadmium pool after the run was 0.039 wt %. The rare earth concentration was <0.01 wt %.

TABLE 8

Composition of Deposits from Drawdown Tests

| Run No. | Composition[a] of Cathode Product, wt % | | |
|---|---|---|---|
| | Uranium | Zirconium | Salt |
| 70 | 70.0 | 0.1 | 30.2 |
| 71 | 79.5 | 0.06 | 19.6 |
| 72 | 31.8 | 17.3[b] | 40.6 |
| 75 | 39.2 | 0.05 | 63.6 |
| 76 | 32.4 | 0.09 | 66.9 |

[a]Estimated uncertainty in the chemical analysis is ±5 to 10%.
[b]Cadmium chloride was added to the electrorefiner prior to this run. Zirconium in the cadmium pool was oxidized and subsequently reduced at the cathode.

TABLE 9

Rare Earth Concentration In Deposits From Drawdown Tests

| Run No. | Concentration[a] of Rare Earth in Cathode Deposit wt % | | |
|---|---|---|---|
| | Cerium | Neodymium | Yttrium |
| 70 | b | b | b |
| 71 | b | b | b |
| 72 | 2.8 | b | b |
| 75 | 0.9 | 0.8 | 0.1 |
| 76 | 1.3 | 1.2 | 0.2 |

[a]Does not include the rare earth chloride in the salt.
[b]The rare earth (Ce, Nd, and Y) concentration in the deposit was accounted for by the concentration of rare earth chloride in the deposit.

TABLE 10

Composition of Salt and Cadmium Pool After Drawdown Tests

| Run No. | Composition wt % | | | | | | | |
|---|---|---|---|---|---|---|---|---|
| | Salt | | | | Cadmium Pool | | | |
| | U | Ce | Nd | Y | U | Ce | Nd | Y |
| 70 | 2.31 | 0.73 | 0.71 | 0.16 | 0.21 | <0.01 | <0.01 | <0.01 |
| 71 | 1.19 | 0.72 | 0.68 | 0.16 | 0.29 | <0.01 | <0.01 | <0.01 |
| 72[a] | 1.25 | 0.98 | 0.93 | 0.21 | <0.01 | <0.01 | <0.01 | <0.01 |
| 75[a] | 0.26 | 0.83 | 0.82 | 0.18 | 0.039 | <0.01 | <0.01 | <0.01 |
| 76[b] | 0.02 | 0.50 | 0.49 | 0.17 | 0.19 | 0.17 | 0.18 | <0.01 |

[a]Cadmium chloride was added to the electrorefiner prior to this run.
[b]At the start (Run 58) of the drawdown, the concentration of uranium was 7.09 wt % (19.397 kg uranium) in the salt and 0.19 wt % (0.593 kg uranium) in the cadmium pool; from Run 58 to Run 76, 96.3 wt % of the uranium was removed from the electrorefiner.

Run 76—The operating procedure used for this test was identical to that used in Run 75. The 5.8 wt % lithium-cadmium alloy (3.586 kg) was loaded into the anodic dissolution baskets and used to electrotransport uranium and rare earths from the salt to the tip of the LCC dendrite breaker. An alumina crucible was positioned to catch the deposit that fell off the breaker.

The operating time for this run was 45 h and the average current was 18.7 A. The dendrite breaker was coated with the product. The weight of product deposited on the dendrite breaker increased until a bridge was formed between the dendrite breaker, which was rotated at 15 rpm, and the alumina-collection crucible. and into the cadmium pool. During the run, the uranium concentration in the cadmium pool increased from 0.039 to 0.19 wt % (see Table 10). The cerium and neodymium concentration in the cadmium pool also increased (0.17 and 0.18 wt %, respectively).

The inner and outer walls of the alumina catch-crucible were covered with product scraped off of the dendrite breaker. To eliminate this problem in subsequent drawdown tests, the dendrite breaker will be replaced with a solid steel mandrel. Less product buildup is expected on the steel mandrel.

The weight of the cathode deposit collected in Run 76 was 2.06 kg. The composition of the deposit is given in Table 8. The deposit contained 32.4 wt % uranium, 66.9 wt % salt, and 0.09 wt % zirconium. The concentrations of cerium, neodymium, and yttrium in the deposit were 1.3, 1.2, and 0.2 wt %, respectively (see Table 9).

The composition of the salt after Run 76 is given in Table 10. The uranium concentration in the salt was reduced to 0.02 wt %. The concentration of cerium and neodymium were reduced to about 50% of the highest values measured in Run 72. The concentration of yttrium was reduced to about 80%.

Drawdown Runs 77 and 78 were completed during this reporting period. The objective of these tests was to determine the lowest uranium and rare concentrations that can be achieved in the salt by electrotransport of uranium and rare earths from the salt to a solid mandrel cathode. A paste-like product was collected in Run 77. The product in Run 78 was more fluid and escaped through the slit in the "catch-crucible" to the cadmium pool in the electrorefiner.

In Runs 79 and 80, uranium and rare earths were electrotransported from the cadmium pool anode to a solid mandrel cathode. A solid product was collected in Run 79.

The fluid product collected in Run 80 also escaped through the slit in the "catch crucible" to the cadmium pool.

Results for the above tests are presented below.

Run 77—In this test, uranium and rare earths were electrotransported from the salt to a solid mandrel cathode with 3.539 kg lithium-cadmium alloy (5.8 wt % lithium) that was loaded into the anodic dissolution baskets. The salt and cadmium pool were mixed at 75 and 50 rpm, respectively. The solid mandrel cathode was rotated at 15 rpm.

The operating time of the drawdown of Run 77 was 21.8 h and the average current was 32.8 A. The operating voltage was typically 1.1 V and the resistance was between 30 and 40 mΩ. This lower resistance, compared with that (100–200 mΩ) in the previous drawdown run (Run 75), was due to the higher cathode area (234.5 cm$^2$ for Run 77 compared with 15.5 cm$^2$ for Run 75).

Previous drawdown runs (e.g. Run 72) have shown an increase in resistance when the lithium-cadmium alloy is depleted from the anodic dissolution baskets. An examination of the baskets after Run 77 showed that 3 of the 4 baskets contained a small amount of alloy. Thus, the decline in resistance near the end of Run 77 reflects the decline in resistance due to increased surface area at the cathode as more product is deposited on the cathode.

There was about 40% of the product from Run 77 adhered to the solid mandrel cathode. The smooth product at the tip of the mandrel shows the paste-like characteristics of the deposit. This material did not slump when the salt drained away.

The weight of the deposit collected in Run 77 was 3.0 kg. The composition of the deposit is given in Table 11. The composition of the deposit was 31.8% rare earths (17.7 wt % cerium, 9.8 wt % neodymium, and 4.3 wt % yttrium), 79.6% salt, 0.6 wt % uranium, and <0.01 wt % zirconium. The rare earth concentration in this deposit is higher than that of any of the deposits collected in previous drawdown runs. Conversely, the uranium concentration in this deposit was lower than that measured in any of the previous drawdown runs. The zirconium concentration in the deposit is very low (<0.01 wt %).

TABLE 11

| Composition of Cathode Deposits from Drawdown and Depletion Tests | | |
|---|---|---|
| Composition, wt % | Drawdown Run 77 | Depletion Run 79 |
| Uranium | 0.6 | 1.8 |
| Cerium | 17.7 | 8.5 |
| Neodymium | 9.8 | 5.2 |
| Yttrium | 4.3 | 8.7 |
| Salt | 79.6 | 78.0 |
| Zirconium | <0.01 | 0.05 |

The compositions of the salt and cadmium pool after Run 77 are given in Table 12. By comparison with the compositions after Run 76, the uranium concentration in the salt was reduced from 0.02 wt % to 0.01 wt %; the total rare earth concentration in the salt was reduced from 1.15 wt % (0.50 wt % cerium, 0.49 wt % neodymium, and 0.11 wt % yttrium). The uranium concentration in the cadmium pool increased slightly from 0.19 wt % to 0.21 wt %; the total rare earth concentration in the cadmium pool increased from 0.35 wt % (0.17 wt % cerium, 0.18 wt % neodymium, and <0.01 wt % yttrium) to 0.57 wt % (0.27 wt % cerium, 0.30 wt % neodymium, and <0.01 yttrium).

TABLE 12

| Composition of Salt and Cadmium Pool after Drawdown and Depletion Tests | | | | | | | | |
|---|---|---|---|---|---|---|---|---|
| | Composition, wt % | | | | | | | |
| | Salt | | | | Cadmium | | | |
| Run No. | Uranium | Cerium | Neodymium | Yttrium | Uranium | Cerium | Neodymium | Yttrium |
| 77 | 0.01 | 0.16 | 0.17 | 0.11 | 0.21 | 0.27 | 0.30 | <0.01 |
| 78[a] | 0.005 | 0.14 | 0.13 | 0.11 | 0.39[b] | 0.35 | 0.37 | <0.01 |
| 79 | <0.01 | 0.14 | 0.14 | 0.09 | 0.43[b] | 0.28 | 0.32 | <0.01 |
| 80 | <0.01 | 0.12 | 0.15 | 0.08 | 0.40 | 0.24 | 0.30 | <0.01 |

[a]Cadmium chloride (2.1 kg) was added to the electrorefiner prior to Run 78.
[b]Uranium concentration increased after salt mixer was removed from electrorefiner and exposed uranium trapped in one of the crucible-liner wells to the cadmium pool.

Run 78—In this test, 3.286 kg lithium-cadmium alloy (5.8 wt % lithium) was loaded into the anodic dissolution baskets and used to electrotransport uranium and rare earths from the salt to a solid mandrel cathode. The cadmium mixer, anodic dissolution baskets, and solid mandrel cathode were operated at 50, 75, and 20 rpm, respectively. The salt mixer was not used because of a mechanical failure.

Over a period of 138 hours, an average current of 5.2 A was passed through the electrorefiner. No product was collected on the solid mandrel cathode. The uranium and rare earths electrotransported to the solid mandrel cathode slipped off of the mandrel, fell into the "catch crucible," escaped through the slit in the crucible, and fell into the cadmium pool.

Cadmium chloride (2.1 kg) was added to the electrorefiner prior to this run to transfer rare earths from the cadmium pool into the salt. The subsequent reduction of rare earths in the salt by the lithium-cadmium alloy during the drawdown resulted in only a small reduction (cerium −13% and neodymium −24%) in the rare earths in the salt (Table 12). The rare earth concentration in the cadmium pool (Table 12) increased (cerium +30% and neodymium +23%). The increased uranium concentration in the cadmium pool occurred after the salt mixer was removed from the electrorefiner. Uranium that had been trapped in one of the crucible-liner wells (4 holes in the bottom of the crucible liner) by the ballast plug on the lower end of the salt mixer was exposed to the cadmium pool after the mixer was removed.

Run 79—The objective of this test was to electrotransport uranium and rare earths from the cadmium anode pool to a solid mandrel cathode. The cadmium mixer and solid mandrel cathode were operated at 50 and 20 rpm, respectively. The electrode brushes for the anodic dissolver were removed and the anodic dissolution baskets were used to mix the salt at 75 rpm.

The operating time of Run 79 was 161.5 hours and the average current was 7.7 A. The operating voltage range was 0.6 to 0.8 V. At the start of the test, the cell resistance was 140 m$\Omega$ and decreased to 65 m$\Omega$ at the end of the run.

The total weight of the deposit from Run 79 was 1.8 kg. Most of the deposit was collected in the catch crucible. The composition of the deposit is given in Table 11. The composition of the deposit was 1.8 wt % uranium, 8.5 wt % cerium, 5.2 wt % neodymium, 8.7 wt % yttrium, 78.0 wt % salt and 0.05 wt % zirconium. As expected, the higher concentration of uranium and zirconium in the cadmium pool, compared with these concentrations in the salt, resulted in a higher concentration of these materials in the deposit, as compared with the concentrations in the deposit from Run 77, which was collected with electrotransport from the salt. The higher yttrium concentration in the deposit from Run 79, compared with that from Run 77, and the low concentration of yttrium (<0.01 wt %) measured in the cadmium pool indicate that the yttrium was tied up with undissolved solids on the crucible wall or on components in the electrorefiner at the same potential as the cadmium pool.

The compositions of the salt and cadmium pool after Run 79 are given in Table 12. The salt composition showed no change because Run 79 was a cadmium pool depletion run. There was a decrease in rare earth concentration in the cadmium pool in line with the removal of rare earths in the cathode product (Table 11). As observed for Run 78, there was an increase in the uranium concentration in the cadmium pool because of uranium that was trapped in one of the crucible-liner wells was exposed to the bulk cadmium pool when the salt mixer was removed from the electrorefiner for repair.

Figure 2:
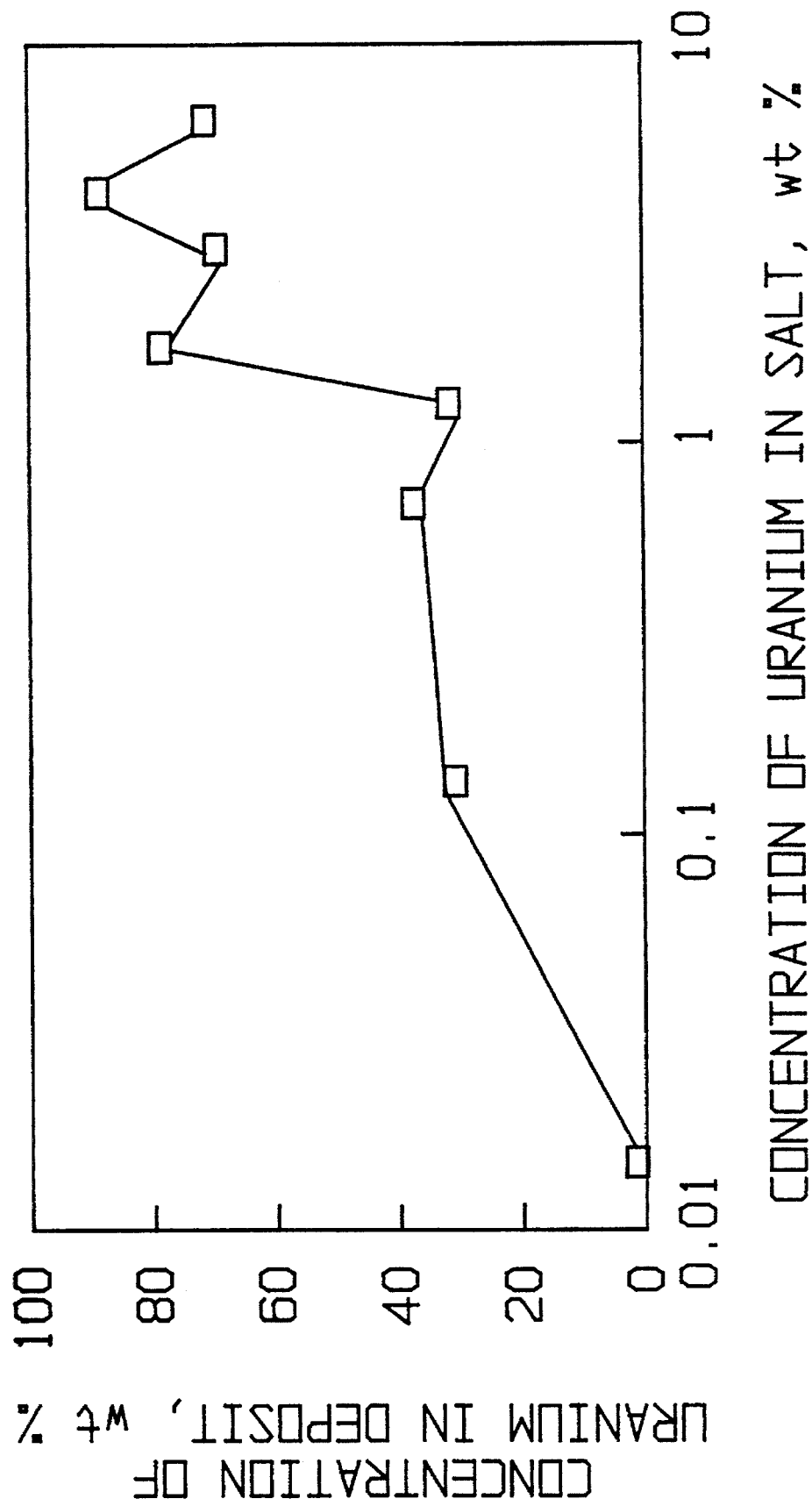
FIG. 2 is a graphical representation of the relationship between the uranium concentration in the cathode deposit and uranium concentration in the salt.

The average uranium concentrations in the salt during drawdown Runs 58, 65, 70, and 71 were 6.68, 4.33, 2.98 and 1.75 wt %, respectively. The concentrations of uranium in the cathode deposits for these runs were 73.2, 89.3, 70.0 and 79.5 wt %, respectively. They are shown in FIG. 2. A description of Run 65 is given below and is typical of the results for the other tests over this range of uranium concentration in the salt and in the cathode deposit.

Figure 3:
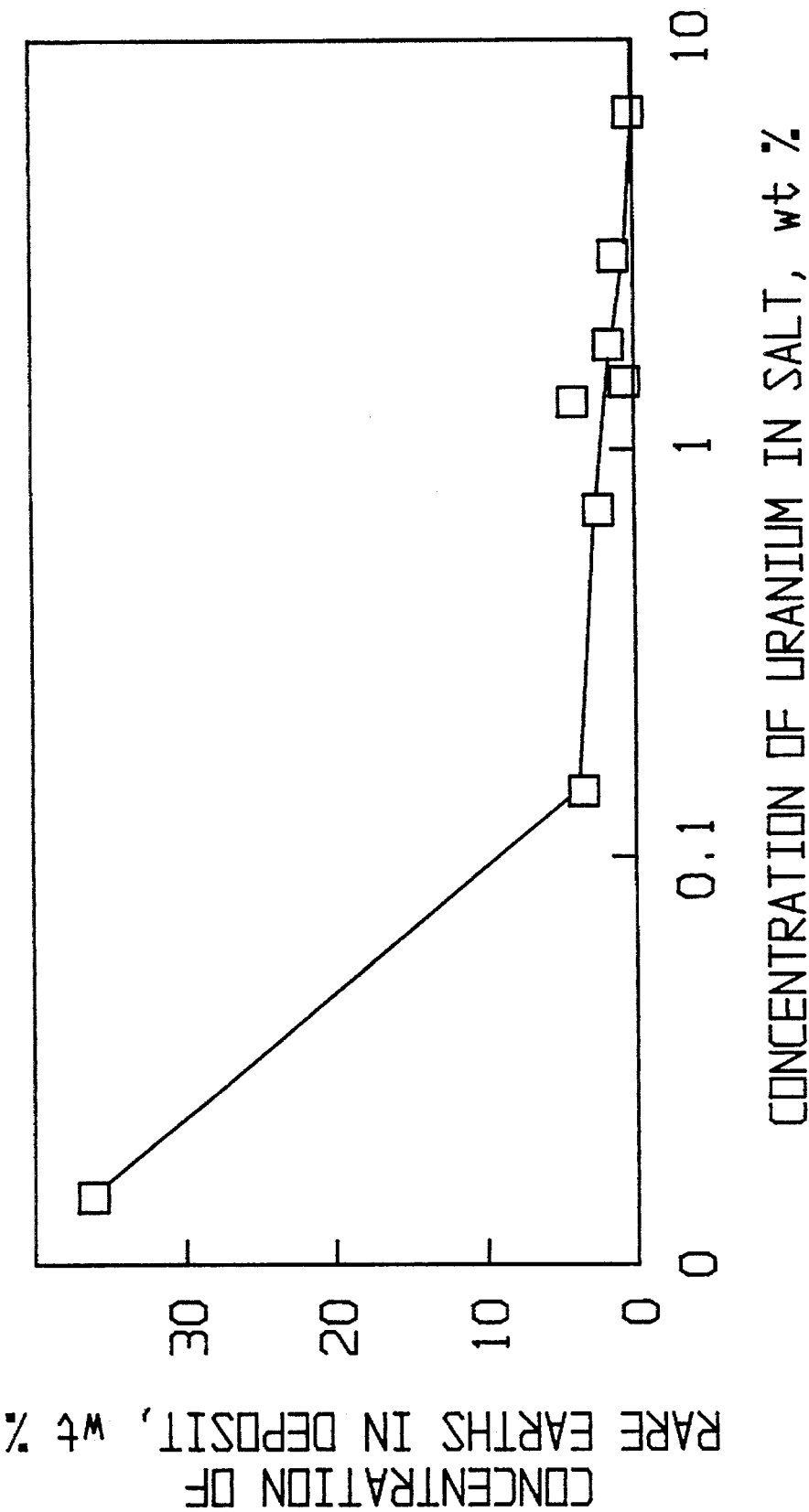
FIG. 3 is a graphical representation of the relationship between the rare earth concentration in the cathode deposit and the uranium concentration in the salt.

The concentrations of rare earths (cerium, neodymium, and yttrium) in the cathode deposits from Runs 58, 65, 70 and 71 were <0.01, <0.01, 1.1, and 1.2 wt %, respectively. These results are shown in FIG. 3. Over this range (1.75 to 6.68 wt %) of uranium concentrations in the salt, the concentrations of rare earths in the cathode deposits were low (1.2 wt % or less).

The average uranium concentrations in the salt during drawdown Runs 72, 75 and 76 were 1.30, 0.72, and 0.14 wt %, respectively. The uranium concentrations in the cathode deposits from these runs were 31.8, 39.2 and 32.4 wt %, respectively. These results are shown in FIG. 2. Run 75 is described below and is typical of the results for the other tests over this range of uranium concentration in the salt and in the cathode deposit.

The concentrations of rare earths in the cathode deposits from Runs 72, 75 and 76 were 2.8, 1.8 and 2.7 wt %, respectively. These results are shown in FIG. 3. Over this range (0.14 to 1.30 wt %) of uranium concentration in the salt, the concentrations of rare earths in the cathode deposits were still low (1.8 to 2.8 wt %).

Good separation can be achieved while removing uranium and rare earths in the salts from the engineering-scale electrorefiner. Only 13% of the rare earths were removed, while 99.9% of the uranium in the salt was removed. The uranium and rare earth concentrations in the salt were reduced to <50 ppm and <0.01 wt %, respectively, using the in-situ drawdown techniques described. Drawdown tests are needed to determine the separation between plutonium and rare earths in the salt while removing the HM from the salt.

The objectives of the drawdown tests included the following: 1) a reduction of the uranium concentration in the salt in the electrorefiner in conjunction with a low concentration of rare earths in the cathode product, 2) a reduction of the uranium concentration in the salt to <0.01 wt %, and 3) a reduction of the rare earth concentration in the salt to <0.01 wt %. In the electrorefiner, current was driven through a lithium-cadmium alloy (5.8 wt % lithium) in the anodic dissolution baskets to a solid mandrel cathode positioned above a crucible to collect product that falls off of the solid cathode.

Possible drawdown reactions include the following: 1) electrotransport of lithium to the solid cathode and lithium reduction of uranium and rare earth chlorides in the salt at the solid cathode, and 2) lithium reduction of uranium and rare earth chlorides in the salt at the anode and electrotransport of uranium and rare earths to the solid cathode. The design criteria that had to be met for the drawdown equipment included: 1) control of the reduction rate by lithium, 2) provision for good separation between the uranium and the rare earths, and 3) the capability to remove uranium and rare earths from the electrorefiner over a wide range of salt concentration.

The effect of salt concentration on the concentration of uranium in the cathode product is shown in FIG. 11. This data was taken from earlier tests: Run 58, Run 65, Runs 70 and 71, Run 72, Runs 75 and 76, and Run 77. With a uranium concentration in the salt between 1.5 and 7 wt %, the concentration of uranium in the solid cathode deposit was between 70 and 90 wt %. At a uranium concentration in the salt between 0.1 and 1.3 wt %, the concentration of uranium in the deposit was between 30 and 40 wt %. At 0.015 wt % uranium in the salt, the concentration of uranium in the deposit was <0.1 wt %.

The effect of salt concentration on the concentration of rare earths in the cathode product is shown in FIG. 12. At a uranium concentration in the salt between 4 and 7 wt %, the concentration of rare earths (cerium, neodymium, and yttrium) in the solid cathode deposit was <0.01 wt %. At a uranium concentration in the salt between 0.1 and 3 wt %, the concentration of rare earths in the solid cathode deposit was between 1.0 and 3 wt %. At 0.015 wt % uranium in the salt, the concentration of rare earths in the deposit was about 32 wt %.

The results from drawdown Runs 81 and 82 are presented below. These are the last tests in the uranium and rare earth drawdown experiments. The present freeze of expenditures on chemical analyses has delayed the analysis of salt and cadmium samples taken from Runs 81 and 82. Thus, the lowest concentrations of uranium and rare earths in the salt and cadmium that have been achieved in these experiments are not available. Prior to these tests, the uranium concentration in the salt was reduced to <50 ppm. Good separation between the uranium and rare earths in the cathode products was achieved. During drawdown tests that removed 99.9% of the uranium in the salt, only 13% of the rare earths were removed.

Run 81—In this test, uranium and rare earths were electrotransported from the salt to a solid mandrel cathode. The anodic dissolution baskets were loaded with 5.20 kg lithium-cadmium alloy (5.8 wt % lithium) and an alumina crucible was positioned beneath the solid mandrel cathode to collect the product that fell off of the cathode. The salt and cadmium pool were mixed at 75 and 50 rpm, respectively. The solid mandrel cathode was rotated at 20 rpm.

The operating time of Run 81 was 70 h and the average current was 15.1 A. The operating voltage was typically between 0.7 and 0.8 V and the cell resistance was between 40 and 90 mΩ. This resistance is about twice that measured for drawdown Run 77 and is most likely caused by the lower concentration of rare earth chlorides in the salt in Run 81.

Run 82—The cell configuration (anode and cathode) for this test was the same as that used in Run 81. The anodic dissolution baskets were loaded with 5.197 kg lithium-cadmium alloy (5.8 wt % lithium). The salt and cadmium pool were mixed at 75 and 50 rpm, respectively. The solid cathode was rotated at 20 rpm.

The operating time of Run 82 was 256 h and the average current was 4.2 A. The cell resistance was typically between 100 and 400 mΩ. This resistance is about 4 times higher than that measured in Run 81 and is most likely caused by the lower concentration of rare earth chlorides in the salt. At the start of Run 82, the cell resistance was about 40 mΩ, the same as that measured at the start of Run 81. However, in about 10 h, the resistance increased to 200 mΩ.

In Run 82, all of the product (5.4 kg) was collected on the solid mandrel cathode. The salt in the "catch crucible" was white and there was no evidence of undissolved solids in the salt. Samples were taken of the cathode product, salt, and cadmium pool. Chemical analysis of these samples will be completed when funds are available.

As may be seen, therefore, the subject invention is an improvement over the prior art chemical material not only because it permits drawdown of heavy metal values to the parts per million range, not achievable with the chemical method of the prior art due to the formation of intermetallics, but also because the deposition rate and location of the heavy metal values is controllable, the rate by the current flow since the heavy metal deposition rate is proportional to the current and the location by the position of the cathode. Moreover, good separation of the U values from the rare earth values was obtained, with 99.9% of the U values being separated from the salt while only about 13% of the rare earth were carried along.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. An electrochemical method of separating heavy metal values from a radioactive molten salt at temperatures of about 500° C., comprising positioning a solid Li—Cd alloy anode in the molten salt where the molten salt contains the heavy metal values, positioning a cathode in the molten salt to recover the heavy metal values where the cathode includes a molten Cd cathode and a solid mandrel cathode wherein said solid cathode is positioned over a catch crucible in the molten salt to recover the heavy metal values, establishing a current flow between the anode and the cathode to deposit heavy metal at the cathode, establishing a current flow between the anode and solid mandrel cathode to remove remaining heavy metals and reducing the concentration of heavy metals in the salt to remove the said heavy metals.

2. The method of claim 1, wherein the heavy metal values include U and Pu.

3. The method of claim 1, wherein the heavy metal values include rare earths.

4. The method of claim 1, wherein the heavy metal values include uranium, plutonium, and rare earth elements.

5. The method of claim,1, wherein the salt is an alkali metal halide.

6. The method of claim 1, wherein the salt is an alkali metal chloride.

7. The method of claim 1, wherein the salt is a mixture of LiCl—KCl.

8. The method of claim 1, wherein the cathode is a solid mandrel cathode with a molten Cd cathode modified to accommodate a ceramic receiver crucible.

9. The method of claim 1, wherein the heavy metal values include U and the current is established until the U values in the salt are less than 5 ppm.

10. The method of claim 1, wherein the solid anode has about 6% by weight Li.

11. The method of claim 1, wherein substantially all the uranium values are removed from the molten salt while a minor amount of the rare earth values are removed.

12. An electrochemical method of separating heavy metal values from a radioactive molten lithium salt at temperatures of about 500° C., comprising positioning a solid Li—Cd alloy anode in the molten salt where the molten salt contains the heavy metal values, positioning a dual cathode in the molten salt to recover the heavy metal values where the cathode includes a molten Cd cathode and a solid mandrel cathode, wherein said solid cathode is positioned above a catch crucible in the molten salt to recover the heavy metal values, establishing a voltage drop between the anode and the cathodes to deposit heavy metals at the cathode to reduce the concentration of the heavy metals in the salt, and controlling the deposition rate at the cathode by controlling the current between the anode and cathode removing said heavy metals.

13. The method of claim 12, wherein the Li—Cd alloy anode is about 6% by weight Li.

14. The method of claim 12, wherein the molten salt is agitated while the heavy metal values are transported from the salt to the cathode.

15. The method of claim 12, wherein the cathode is a dual cathode having a solid mandrel cathode and a molten Cd cathode modified to accommodate a ceramic receiver crucible.

16. The method of claim 12, wherein the heavy metal values are transported to the cathode until the uranium concentration in the salt is less than 5 ppm.

17. The method of claim 12, wherein the uranium values are substantially all transported from the salt to cathode while a minor portion of the rare earth values are transported from the salt to the cathode.

* * * * *